No. 692,188. Patented Jan. 28, 1902.
C. W. FORD.
ANIMAL POKE.
(Application filed Oct. 10, 1901.)
(No Model.)
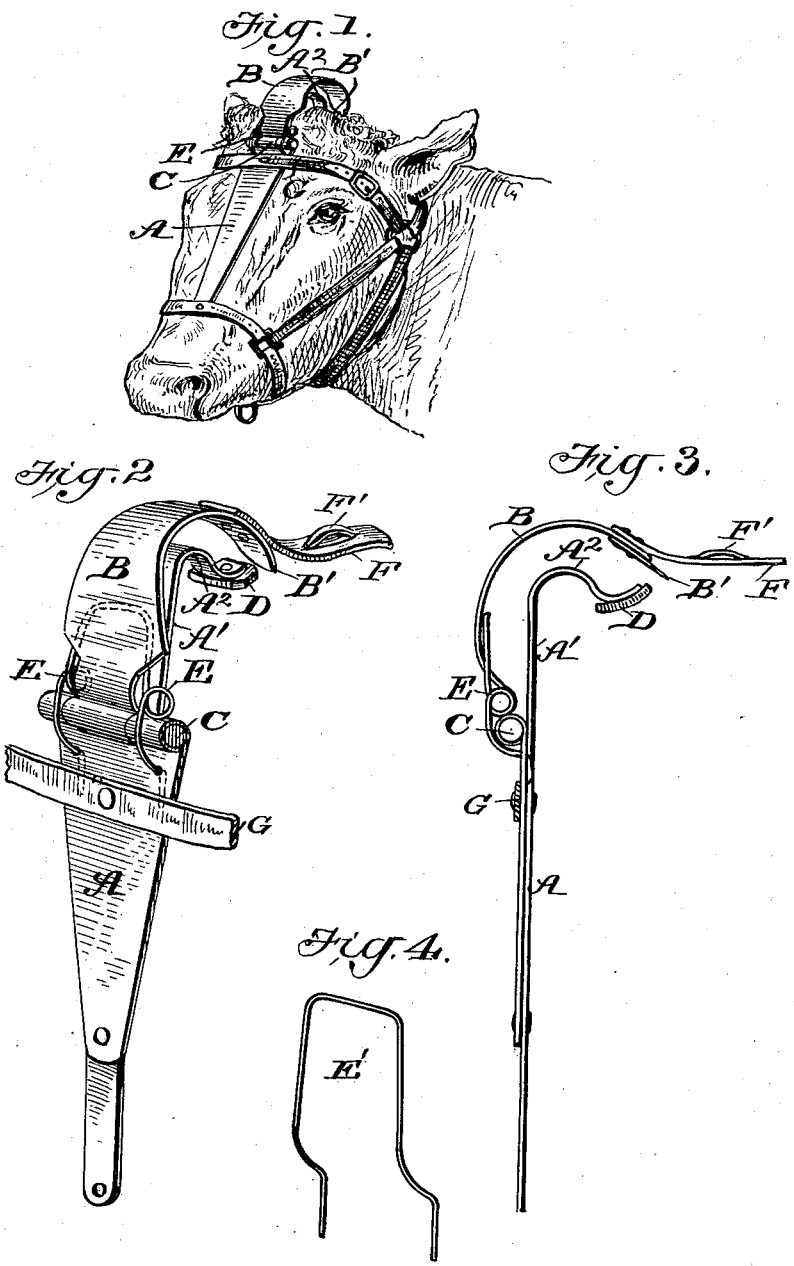
WITNESSES:
Jos. A. Ryan
Geo. S. Brock
INVENTOR
Clayton W. Ford.
BY Munn & Co.
ATTORNEYS

UNITED STATES PATENT OFFICE.

CLAYTON WARREN FORD, OF FINDLAY, OHIO.

ANIMAL-POKE.

SPECIFICATION forming part of Letters Patent No. 692,188, dated January 28, 1902.

Application filed October 10, 1901. Serial No. 78,197. (No model.)

*To all whom it may concern:*

Be it known that I, CLAYTON WARREN FORD, of Findlay, in the county of Hancock and State of Ohio, have invented a new and useful Improvement in Animal-Pokes, of which the following is a specification.

My invention relates to an improvement in animal-pokes, and has for its object to provide a simple and effective device to prevent cows and other animals from butting or "jamming."

To this end my invention consists in the peculiar construction, arrangement, and combination of parts, as will be hereinafter fully described, and pointed out in the claims.

In the drawings, Figure 1 is a perspective view of my invention secured to the head of a cow by halter-straps. Fig. 2 is a perspective view of the device detached from the halter-straps. Fig. 3 is a side elevation of same. Fig. 4 is a detail view of a modified form of spring for throwing forward the arched upper plate.

A represents a face-plate made, preferably, of metal, which is provided at its upper portion with a curved or hooked portion A', the end of the curved or hooked portion being curved upwardly and rearwardly, as at A². The lower portion of the face-plate extends downwardly in front of face of the cow or animal to which it is attached and is secured by rivets or other means at its lower end to the nose-band of a headstall or halter. Near the upper portion of the face-plate a head-plate B is hinged to said face-plate by a hinge-joint or suitable pivot C. The head-plate B is curved or arched forwardly and upwardly and then rearwardly above and beyond the face-plate to a point above or slightly to the rear of the hook A² of the face-plate A. The rear end of the arched or curved head-plate tapers to a point B', forming a spur, which may be integral with the plate B or it may be secured thereto by rivets or other suitable means. The rear end of the hooked end A' has secured to its under face a pad or cushion D, made of leather or other suitable material by means of rivets or other suitable means. The cushion D rests in the cavity of the cow's head just behind the base of the horns. In other words, the rigid plate A is hung by its hook A' on the top of the cow's head. The upper member or head-plate B of the device is cut out at each side near its lower end to allow the side members of the spring E to pass. Said spring consists of a piece of stout wire of the requisite tension, the ends of which are hooked and secured in holes made in the plate A just below the pintle C. The arms of the spring are then carried upwardly and formed into coils which rest upon the pintle C. The arms are then continued upwardly and slightly forwardly, where they form a loop and normally pass or bear against the arched head-plate B. The spring may also be made without the coils, as shown in Fig. 4 at E'.

The spur or point B' may be secured to the rear end of the arched plate B by means of the rivets, and the same rivets may be used to secure the head-strap F of the halter to the said arched plate B; but this is not absolutely necessary, as said strap may be secured by other suitable means. The arched or curved head-plate B passes up over the cow's head and down to the tender place in the neck just behind the head. The spring E normally presses the arched or curved head-plate B forwardly, so that the spur or point does not stick into the neck and cause injury; but when the animal attempts to butt or "jam" it does so with the top portion of the head. The instant this is done the plate striking the object attacked is forced backwardly and downwardly and the point or spur B' enters the aforesaid tender spot in the neck and causes the animal to desist.

Various forms of springs may be used and the spring may be so secured around the pintle of the hinged joint as to normally throw the member B outwardly. The device may be made of an ordinary strap-hinge, in which case the hooked or curved portion A' will be a separate piece riveted to the rear face of face-plate and extending downwardly, where it is attached to the nose-band. The member B is given the required curve, and the spur or point may be integral with or attached to its rear end. Any suitable headstall or halter may be attached to the device.

From the above it will be seen that I provide a simple and efficient device that is positive in its action and effects its purpose by pricking the cow or other animal in a tender spot and not at a point where there is a bone to resist the action of the spur.

The device can cause no injury to the cow, as it will discontinue the jamming or butting before the point or spur B' is driven far enough into the neck to accomplish that. The pad D, which is preferably of leather, rests upon the head, as stated, just behind the base of the horns and prevents any chafing that might ensue should the metal be used alone.

The operation of my device will be readily understood to be as follows: The device being attached to the cow's head by the head-strap or halter-straps and connections, the arched head-plate B passes upward and over the head, and the point B' is normally held away from the neck of the cow by virtue of the spring E pressing against arched head-plate B. Should the cow attempt to butt or what is known as "jamming," pressure against the arched plate B overcomes the force of the spring E and causes the spur or point B' to be buried in the tender part of the neck of the cow and cause it to discontinue the butting or jamming. As soon as the pressure is released the spring E throws the arched head-plate B outwardly to its normal condition.

The spur or point B' will preferably be made integral with the arched or curved head-plate B, as shown in Fig. 2, and has secured to it the strap F, provided with the loop F'.

The cross-strap G is secured to the face-plate A a short distance below the joint C.

Having thus described my invention, what I claim as new, and desire to secure by Letters Patent, is—

1. In a device of the character described a face-plate having a hooked upper end, a curved head-plate pivoted directly to the face-plate near its upper end, a spur or point at the free end of and forming a prolongation of the curved head-plate, and a spring for normally forcing the curved head-plate away from the face-plate, substantially as shown and described.

2. In a device of the character described, a face-plate having a hook at its upper end, an arched head-plate pivoted at its lower end directly to the front of the face-plate near the upper end of the same, a spur or point at the free end of the arched head-plate forming a prolongation thereof, and a spring secured to the face-plate at or near the point of connection of the face and head plates and bearing against the rear face of the arched head-plate, whereby the said head-plate is normally forced forwardly, substantially as shown and described.

3. In a device of the character described, a face-plate, a hook at its upper end, an arched head-plate pivoted directly to the front of said face-plate at its upper portion, a spur or point at the free end of the head-plate forming a prolongation thereof, and a spring interposed between the said face-plate and the arched head-plate, substantially as shown and described.

4. In a device of the character described, a face-plate a hook at the upper end thereof, a pad or cushion secured to the end of said hook, adapted to rest upon the head of an animal, an arched head-plate pivoted at its lower end directly to the front face of the upper portion of the face-plate and curved upwardly and rearwardly above the hook at the end of the face-plate, a spur or point forming a continuation or prolongation of the arched plate, a spring secured to the face-plate at or near the point of attachment of the face and head plates, and adapted to normally press the arched plate forwardly, the said spur or point at the end of the arched plate being adapted to be forced into the neck of the animal when pressure is applied to the front of the arched face-plate, substantially as described.

5. In a device of the character described, a face-plate having a hook at its upper end, a pad or cushion secured to the end of the hook adapted to rest upon the head of an animal, an arched head-plate pivoted at its lower end directly to the front of face-plate, a spur or point at the free end of the arched plate forming a continuation or prolongation thereof, a spring secured to the face-plate at or near the junction of the face and head plates, and bearing against the rear face of the arched plate, and means for attaching the device to the head of an animal, substantially as set forth.

6. In a device of the character described, a rigid face-plate, a hook at the upper end thereof whereby the face-plate is adapted to rest on the head of an animal, an arched head-plate pivoted at its lower end directly to the face-plate near its upper end, and curved upwardly, rearwardly and slightly downwardly to a point approximately over the hook end of the face-plate, a spur or point at the end of the arched head-plate forming a continuation or prolongation thereof and projecting slightly to the rear of the hook end of the face-plate, a spring secured to the face-plate and bearing against the rear of the arched head-plate, and means for securing the device to the head of the animal, substantially as described.

7. In a device of the character described, a straight face-plate, a hook at the upper end thereof, having its lower end curved, a pad secured to said curved end, an arched plate secured at its lower end to the front of the face-plate, said arched plate being curved upwardly and rearwardly over the hook at the upper end of the face-plate and terminating in a spur or point, a strap fastened to the face-plate for fastening the same to a headstall, a spring secured to the face-plate between said plate and the arched head-plate and bearing against the rear face of said arched plate, and a strap fastened at or near the free end of the arched plate for securing the same to a headstall, substantially as set forth.

CLAYTON WARREN FORD.

Witnesses:
FRANK P. BLUEFORD,
GAIL M. BLACKFORD.